United States Patent
Ludois et al.

(10) Patent No.: US 11,277,079 B2
(45) Date of Patent: Mar. 15, 2022

(54) BEARING-LESS ELECTROSTATIC FLYWHEEL

(71) Applicant: Wisconsin Alumni Research Foundation, Madison, WI (US)

(72) Inventors: Daniel Ludois, Madison, WI (US); Eric Severson, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 473 days.

(21) Appl. No.: 16/044,101

(22) Filed: Jul. 24, 2018

(65) Prior Publication Data

US 2020/0036299 A1  Jan. 30, 2020

(51) Int. Cl.
*H02N 1/08* (2006.01)
*H02N 1/00* (2006.01)

(52) U.S. Cl.
CPC .............. *H02N 1/002* (2013.01); *H02N 1/00* (2013.01)

(58) Field of Classification Search
CPC ....... G01C 19/00; G01C 19/24; G01P 15/125; G01P 15/14; H02N 1/00; H02N 11/00; H02N 11/002; H02N 1/002; H02N 1/004
USPC ......... 307/400; 310/74, 90.5, 309, 210, 211; 318/116; 74/5.7
See application file for complete search history.

(56) References Cited

U.S. PATENT DOCUMENTS

| | | | | |
|---|---|---|---|---|
| 3,221,563 A | * | 12/1965 | Wing | F16C 32/0404 73/514.06 |
| 3,696,258 A | * | 10/1972 | Anderson | H02N 1/004 310/308 |
| 3,964,341 A | * | 6/1976 | Rabenhorst | F16C 15/00 74/572.12 |
| 4,126,822 A | * | 11/1978 | Wahlstrom | G04C 10/00 310/309 |
| 4,189,654 A | * | 2/1980 | Mourier | H02K 99/00 310/103 |
| 4,897,592 A | * | 1/1990 | Hyde | H02N 1/08 310/309 |
| 5,015,906 A | * | 5/1991 | Cho | G01P 15/08 310/309 |
| 5,187,399 A | * | 2/1993 | Carr | H02N 1/004 310/309 |
| 5,239,222 A | * | 8/1993 | Higuchi | H02N 1/004 310/12.04 |
| 5,353,656 A | * | 10/1994 | Hawkey | G01C 19/24 74/5.41 |
| 5,789,843 A | * | 8/1998 | Higuchi | B65G 54/02 310/309 |

(Continued)

FOREIGN PATENT DOCUMENTS

JP         09-238483       *  9/1997    ............ H02N 1/00

OTHER PUBLICATIONS

English machine translation of Higuchi, JP 09-238482. (Year: 1997).*

(Continued)

*Primary Examiner* — Burton S Mullins
(74) *Attorney, Agent, or Firm* — Boyle Fredrickson, S.C.

(57) ABSTRACT

A bearing-less flywheel both exchanges energy with a rotating flywheel using a regenerative controller via a rotating electrostatic field but also suspends the flywheel with an electrostatic field to provide a compact robust mechanism for energy storage.

18 Claims, 5 Drawing Sheets

(56) References Cited

U.S. PATENT DOCUMENTS

| | | | | |
|---|---|---|---|---|
| 6,534,887 B1* | 3/2003 | Peczalski | ............... | B64G 1/285 |
| | | | | 310/309 |
| 6,856,067 B2* | 2/2005 | Frey | ....................... | G01C 19/00 |
| | | | | 310/309 |
| 7,239,065 B2* | 7/2007 | Horst | ..................... | H02N 1/004 |
| | | | | 310/309 |
| 7,372,186 B2* | 5/2008 | Odaka | .................... | H02N 1/004 |
| | | | | 310/309 |
| 7,825,554 B2* | 11/2010 | Bastian, II | .............. | B64C 27/06 |
| | | | | 310/74 |
| 7,834,513 B2* | 11/2010 | Post | ......................... | H02N 1/08 |
| | | | | 310/309 |
| 8,331,075 B2* | 12/2012 | Kishimoto | ............. | G01C 19/24 |
| | | | | 361/233 |
| 8,441,167 B2* | 5/2013 | Verkoglyad | .............. | H02N 1/08 |
| | | | | 310/309 |
| 2006/0214535 A1* | 9/2006 | Salmon | .................. | H02N 1/004 |
| | | | | 310/309 |
| 2007/0103009 A1* | 5/2007 | Yang | ....................... | H02N 13/00 |
| | | | | 310/40 MM |
| 2016/0344306 A1 | 11/2016 | Ge et al. | | |

OTHER PUBLICATIONS

J. Jin et al. "Direct Electrostatic Levitation and Propulsion", IEEE Transactions on Industrial Electronics, V.44, No. 2, Apr. 1997. (Year: 1997).*

* cited by examiner

BEARING-LESS ELECTROSTATIC FLYWHEEL

STATEMENT REGARDING FEDERALLY SPONSORED RESEARCH OR DEVELOPMENT

None

CROSS REFERENCE TO RELATED APPLICATION

None

BACKGROUND OF THE INVENTION

The present invention relates to flywheel systems for energy storage and in particular to a flywheel system using electrostatic force for both flywheel support and energy transfer.

Flywheel systems store energy in a rotating mass and have long been used in mechanical systems to provide more even power delivery. For example, in a reciprocating engine, a flywheel may provide inertial energy storage when a piston fires and inertial energy release after the piston fires providing smoother power delivery.

Flywheels can be coupled to electromagnetic motors (motor generators) for electrical energy storage. Such flywheel systems are optimized by using high-strength carbon composite materials to permit the flywheel to rotate at high speeds. Such flywheels may be supported with magnetic bearings and operated in a vacuum chamber to minimize frictional and windage losses.

In operation, the electromagnetic motor generator receives electrical power and accelerates the flywheel to store the power as kinetic energy in the rotating flywheel. Energy may be withdrawn from the flywheel by operating the electromagnetic motor in a generator mode to decelerate the flywheel.

Broad application of flywheel systems are limited by cost and complexity of the flywheel structure and bearings, and the high self-discharge rate losses of flywheels which can lose more than 10 percent of their energy per hour.

SUMMARY OF THE INVENTION

The present invention provides a bearing-less electrostatic flywheel using an electrostatic rather than electromagnetic motor. Importantly, electrostatic forces are used not only to accelerate and decelerate the flywheel but also to suspend the flywheel eliminating the need for separate bearing systems. As well as simplifying the flywheel structure, this design can eliminate losses from magnetically induced eddy currents and magnetic saturation losses that can occur in conventional electromagnetic motor and magnetic bearing designs.

More specifically, one embodiment of the invention provides a flywheel system having a housing for supporting a vacuum therein. A stator provides a set of independent electrically conductive plates arranged circularly about an axis and adapted to generate a rotating electrostatic field and a lifting electrostatic field centered on that axis within the housing. A rotor plate is positioned within the housing beneath the stator to be lifted by the static lifting electrostatic field and rotated by the rotating electrostatic field.

It is thus a feature of at least one embodiment of the invention to create a mechanically simple, low-loss flywheel design potentially providing lower cost and lower self discharge.

The upper surface of the rotor plate may be a dielectric material free of electrically conductive plates.

It is thus a feature of at least one embodiment of the invention to provide an "induction" type motor/generator operating asynchronously and simplifying the construction of the rotor.

The rotor may further include an electrically conductive ground plane positioned beneath the dielectric material.

It is thus a feature of at least one embodiment of the invention to improve the operation of the dielectric in responding to a rotating electrostatic field by placing an immediate electrostatic boundary beneath the dielectric layer.

Alternatively, the upper surface of the rotor plate may include radially extending, circularly arrayed electrically conductive plates.

It is thus a feature of at least one embodiment of the invention to provide a "variable capacitance" type motor generator providing synchronous or asynchronous operation.

The electrically conductive plates may intercommunicate through resistive material having a higher electrical resistance than the material of the electrically conductive plates.

It is thus a feature of at least one embodiment of the invention to permit asynchronous operation of the electrically conductive plate system by providing a resistive path between plates allowing for "slip" in the rotational speed of the rotor electrically conductive plate.

The stator electrically conductive plates may extend in a plane above the rotor plate.

It is thus a feature of at least one embodiment of the invention to provide a mechanically simple stator design providing planar electrically conductive plates for both levitation and creating the necessary rotating electrostatic field and that may be readily fabricated.

Alternatively or in addition, the stator electrically conductive plates may further include electrically conductive plates extending downward outside the periphery of the rotor plate.

It is thus a feature of at least one embodiment of the invention to permit the application of electrical forces along a plane of the rotor for centering correction.

The rotor electrically conductive plates may be divided into electrically independent segments each holding multiple electrically independent electrically conductive plates.

It is thus a feature of at least one embodiment of the invention to permit an excitation of the electrically conductive plates to correct for rotor wobble.

The flywheel system may further include a second stator and second rotor positioned for coaxial rotation of the second rotor with the rotor.

It is thus a feature of at least one embodiment of the invention to provide greater energy storage through a stacked configuration and to permit counterrotating rotors for reduced gyroscopic action.

The rotor plate may be substantially free from magnetic materials.

It is thus a feature of at least one embodiment of the invention to eliminate problems of magnetic saturation loss and eddy current loss that can increase self-discharge.

The rotor plate may be a carbon fiber matrix having circumferentially wound carbon fibers.

It is thus a feature of at least one embodiment of the invention to provide a material for high-speed rotation can resist the necessary hoop stresses while providing a usable dielectric or insulating surface.

The same stator electrically conductive plates provide both the rotating electrostatic field and the lifting electrostatic field.

It is thus a feature of at least one embodiment of the invention to maximize the electric area available for levitation and rotation by using a single set of electrically conductive plates for both of these purposes.

The flywheel system may further include a sensor element adapted for a height of the rotor plate with respect to the stator.

It is thus a feature of at least one embodiment of the invention to provide the necessary feedback for stable electrostatic levitation.

The sensor element may be a stationary coil adapted to produce an AC signal electromagnetic field for inducing eddy currents in the material of the rotor.

It is thus a feature of at least one embodiment of the invention to provide a robust contamination-resistant height sensor operable in the environment of the housing.

The flywheel system may include an accelerometer attached thereto.

It is thus a feature of at least one embodiment of the invention to provide a housing-vibration motion sensor for feedforward accommodation of the vibration with respect to control the rotation and levitation of the electrically conductive plate.

The flywheel system may store at least one watt hour of energy as rotated by the rotor and may have a diameter of at least 0.5 inches.

It is thus a feature of at least one embodiment of the invention to provide a flywheel system suitable for applications such as powerline stabilization and automotive energy storage.

The flywheel system may further include a power controller communicating with the electrically conductive plates of the stator panel to apply and receive voltage to and from the stator electrically conductive plates and operating in a first mode to receive electrical power and to generate the rotating electrostatic field and the lifting electrostatic field to lift and rotate the rotor and operating a second mode to regenerate electrical power from a rotating electrostatic field generated by the rotor and to generate the lifting electrostatic field from this regenerated electrical power.

It is thus a feature of at least one embodiment of the invention to provide a power controller suitable for use of the flywheel system electrical energy storage.

The power controller may implement a first feedback loop receiving a signal from a sensor element to control electrostatic energy applied to the electrically conductive plates of the stator for producing the lifting electrostatic field for controlling rotor height and a second feedback loop receiving an operation signal for controlling electrostatic energy applied to the electrically conductive plates of the stator for producing the rotating electrostatic field for controlling rotor rotation.

It is thus a feature of at least one embodiment of the invention to provide a power controller that implements multiple feedback loops to permit both electrostatic levitation and rotation of the flywheel.

The power controller may further implement a third feedback loop receiving a signal from the sensor element to control electrostatic energy applied to the electrically conductive plates of the stator for producing a leveling or centering of rotation of the rotating rotor.

It is thus a feature of at least one embodiment of the invention to actively manage and balance irregularities for extreme high-speed operation.

These particular objects and advantages may apply to only some embodiments falling within the claims and thus do not define the scope of the invention.

DETAILED DESCRIPTION OF THE PREFERRED EMBODIMENT

Figure 1:
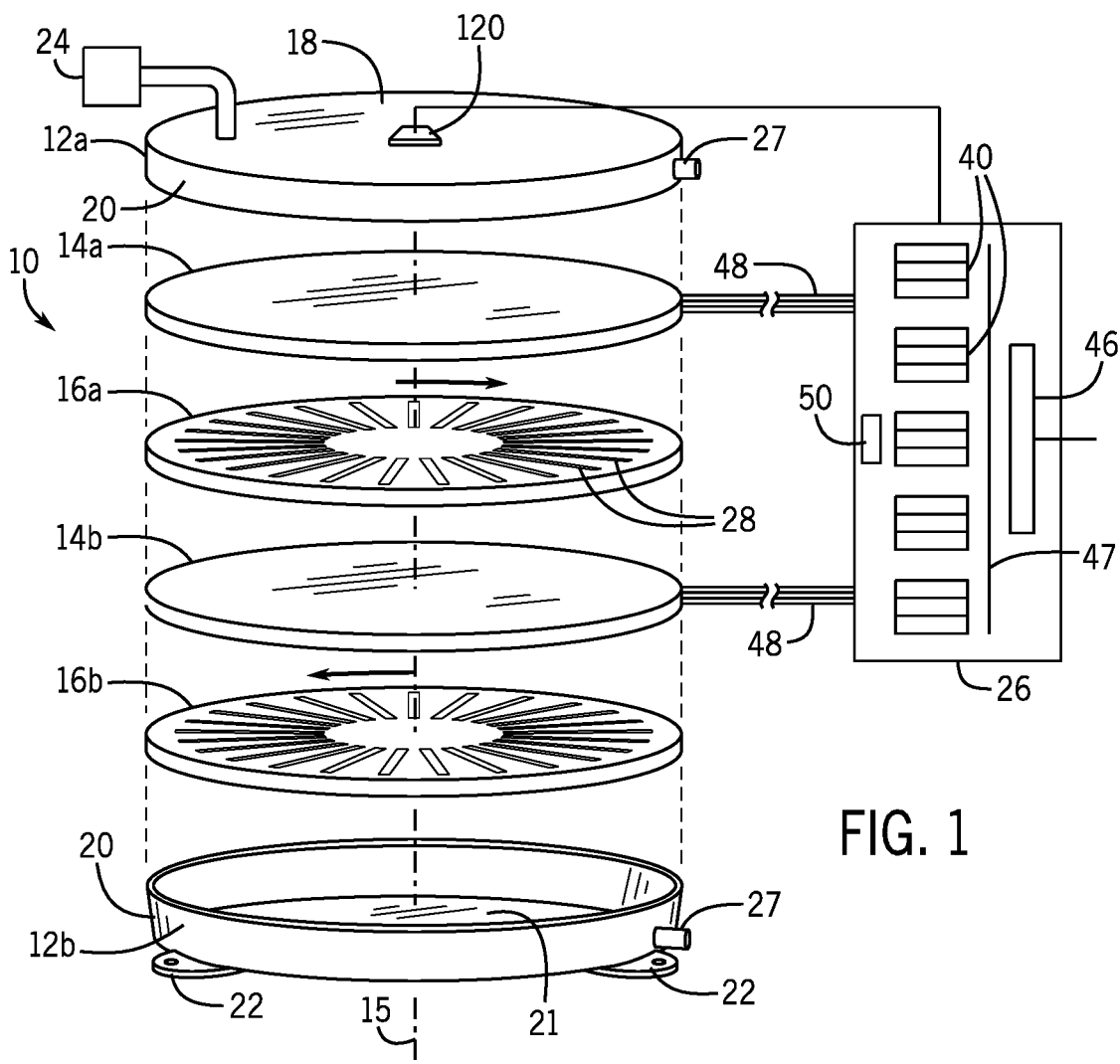
FIG. 1 is an exploded perspective view of a flywheel system of the present invention showing a hermetic housing for supporting two flywheel disks within an evacuated chamber separated by stationary stator panels, the latter communicating with a regenerative controller.

Referring now to FIG. 1, a bearing-less electrostatic flywheel system 10 may provide for an upper housing 12a and lower housing 12b that join together to create an enclosed generally cylindrical airtight volume. The enclosed volume of the housing 12 holds a first and second stator panel 14a and 14b and a first and second rotor disk 16a and 16b each extending generally along separate horizontal planes spaced apart along the vertical axis 15.

The upper housing 12a may provide for the upper circular lid 18 and downwardly extending circular peripheral wall 20 joining at its rim with corresponding circular peripheral wall 20 of housing 12b extending upward from a lower circular base 21. The housing 12 may have mounting points 22, for example, to attach it to a stationary surface or vehicle or the like. The volume within the assembled housing 12 may be evacuated, for example, use of a vacuum pump 24.

Each of the stator panels 14 may be fixed with respect to the housing, for example, by attaching them at their peripheral edges to the inner surfaces of the wall 20. As so fixed, a rotor disk 16 is positioned immediately beneath each stator panel 14. During operation, the rotor disks 16 will rotate rapidly, preferably in opposite directions about the vertical axis 15 to reduce the angular momentum of the flywheel system 10 and to store and release electrical energy as will be discussed below.

Each of the stator panels 14 may be connected to a power controller 26 by respective wiring harness 48 passing through respective airtight glands 27. The wiring harnesses 48 may provide electrical power to the stator panels 14 for levitation of the rotor disks 16 and rotation of the same or receive electrical power from the stator panels 14 when extracting electrical energy from the rotating rotor disks 16 as will be discussed.

Figure 2:
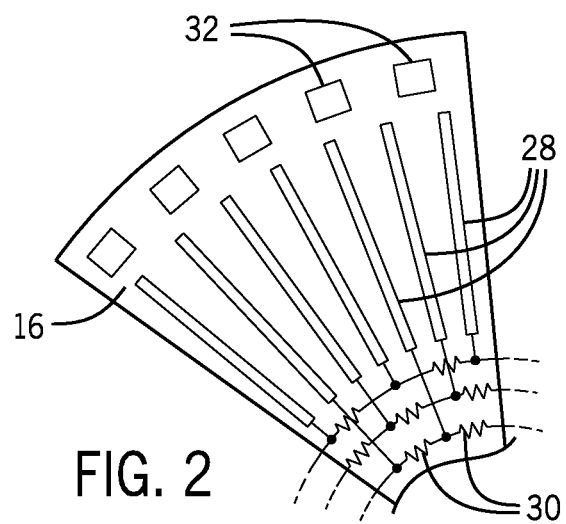
FIG. 2 is a fragmentary top plan view of a rotor of FIG. 1 providing electrically conductive plates used for both levitation and rotation and further including a timing track of conductive material for rotational speed and elevation height measurement.

Referring now to FIG. 2, the rotor disks 16 may be electrically insulating circular disks supporting on their upper planar surfaces radially-extending and circumferentially spaced, electrically conductive plates 28. "Plates" as used herein refers to discrete zones of high conductivity as distinguished from a homogenous low conductivity, for example, employed in a dielectric material discussed below with respect to FIG. 9. Typically these plates will be angularly periodic about the rotational axis of the rotor disk 16. In this embodiment electrically conductive plates 28 provide for both levitation of the rotor disk 16 and rotational energy transfer as will be discussed. These electrically conductive plates 28, for example, may be constructed of an electrically conductive material such as copper or aluminum clad to the upper surface of an insulating substrate such as a carbon fiber composite.

Every third rotor plate 28 of the set of rotor plates 28 may be connected together by means of resistances 30 constructed of a material having higher linear resistance than the material of the rotor plates 28. The resistances 30 provide a phase lagging, rotating circulation of voltages on the rotor plates 28 analogous to the lagging magnetic field of a standard electromagnetic induction motor. An outer periphery of the upper surface of the rotor disks 16 may have a timing track 32 formed, for example, of spaced regions of conductive material whose presence may be sensed by an eddy current sensor as will also be discussed below.

Figure 3:
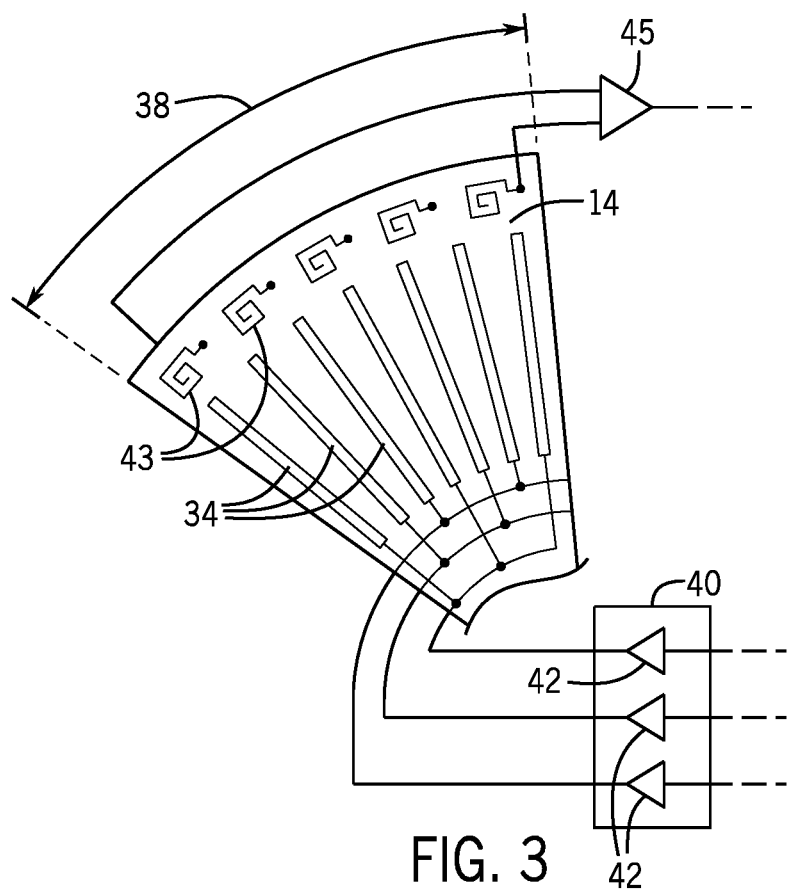
FIG. 3 is a figure similar to that of FIG. 2 showing a bottom plan view of electrically conductive plates on the stator for generating levitation and rotation electrical fields, in one sector electrically independent of the electrically conductive plates of adjacent sectors, and further showing interrogation coils for making eddy current measurements of the timing track of FIG. 2 and a periodic connection of the electrically conductive plates for generating or harvesting a rotating electrical field.

Referring to FIG. 3, a corresponding under surface of the stator panels 14 may have corresponding electrically conductive plates 34 identically spaced and of equal radial extension as the rotor plates 28. These electrically conductive plates 34 may be collected into angular sectors 38 wherein the electrically conductive plates 34 of each angular sector 38 are electrically independent of other angular sectors 38 spaced circumferentially on either side thereof. Every third electrically conductive plate 34 of multiple such conductive plates 34 in each angular sector 38 may be connected together as a "phase" and the phases are generally electrically independent. Each phase of electrically conductive plates 34 connects to a different corresponding phase amplifier 42 of a sector set 40 specific to that angular sector 38. By driving the phase amplifiers 42 properly, a circumferentially traveling voltage waveform may be developed to rotate the rotor disks 16, or conversely, a circumferential traveling voltage waveform generated by the rotor disks 16 may be harvested to slow rotation of the rotor disk 16 to generate electrical power.

In this respect, the phase amplifiers 42 are regenerative, capable of outputting or receiving electrical power. This phase amplifier 42 shares electrical power along a common DC bus 47. As will be understood from the following discussion, the sharing of electrical power allows an effective mechanical coupling between the two rotor disks 16a and 16b with respect to gyroscopic precession implemented by a sharing of driving and generated forces used to stabilize the rotor disks 16a and 16b.

A set of spaced eddy current detecting coils 43 may be positioned at the periphery of the stator panels 14 having a same periodicity along a circumferential direction as the conductive regions of the timing track 32 creating an eddy current signal detectable by eddy current driving and detecting circuitry 45. In this regard, and referring momentarily to FIG. 5, each sensing coil 43 may be positioned to be above a corresponding timing track 32 on the periphery of the stator panel 14 and rotor disk 16.

The eddy current signal produced by the eddy current detecting coils 43 and the driving and detecting circuitry 45 will have a frequency proportional to the rotation speed of the rotor disk 16 and a strength dependent on the separation between the rotor disk 16 and the stator panel 14. In this way the eddy current signal can provide each of: (1) an RPM signal indicating a rotational rate of the rotor disk about axis 15, (2) a rotational position signal indicating a relative rotational position of the rotor disk 16 with respect to a stationary point on the housing 12, (3) a separation signal indicating a separation between a rotor disk 16 and its respective stator panel 14 and, (4) a wobble signal indicating an angular deviation of the rotational axis of the rotor disk 16 and a surface normal of the upper surface of the rotor disk 16. Generally, the RPM signal can be obtained by extraction of a peak frequency of the eddy current signal in a high-frequency band in a range defined by a range of expected rotational speeds of the rotor disk 16 times the number of patches on the timing track 32. The position signal may be obtained by simply counting zero crossings in this frequency band. The elevation signal may track the peak amplitude of the eddy current signal (dropping as the separation drops and eddy current magnitude rises), and the wobble signal may be obtained by extraction of a peak frequency of the eddy current signal in a low frequency band defined by the expected rotational speed of the rotor disk 16.

It will be appreciated that other types of sensors including optical sensors, Hall effect sensors, capacitance sensors or sensors using changes in the drive voltages and/or drive currents caused by interaction between the rotor and stator (self sensing) and the like may be used for these sensing purposes.

Figure 4:
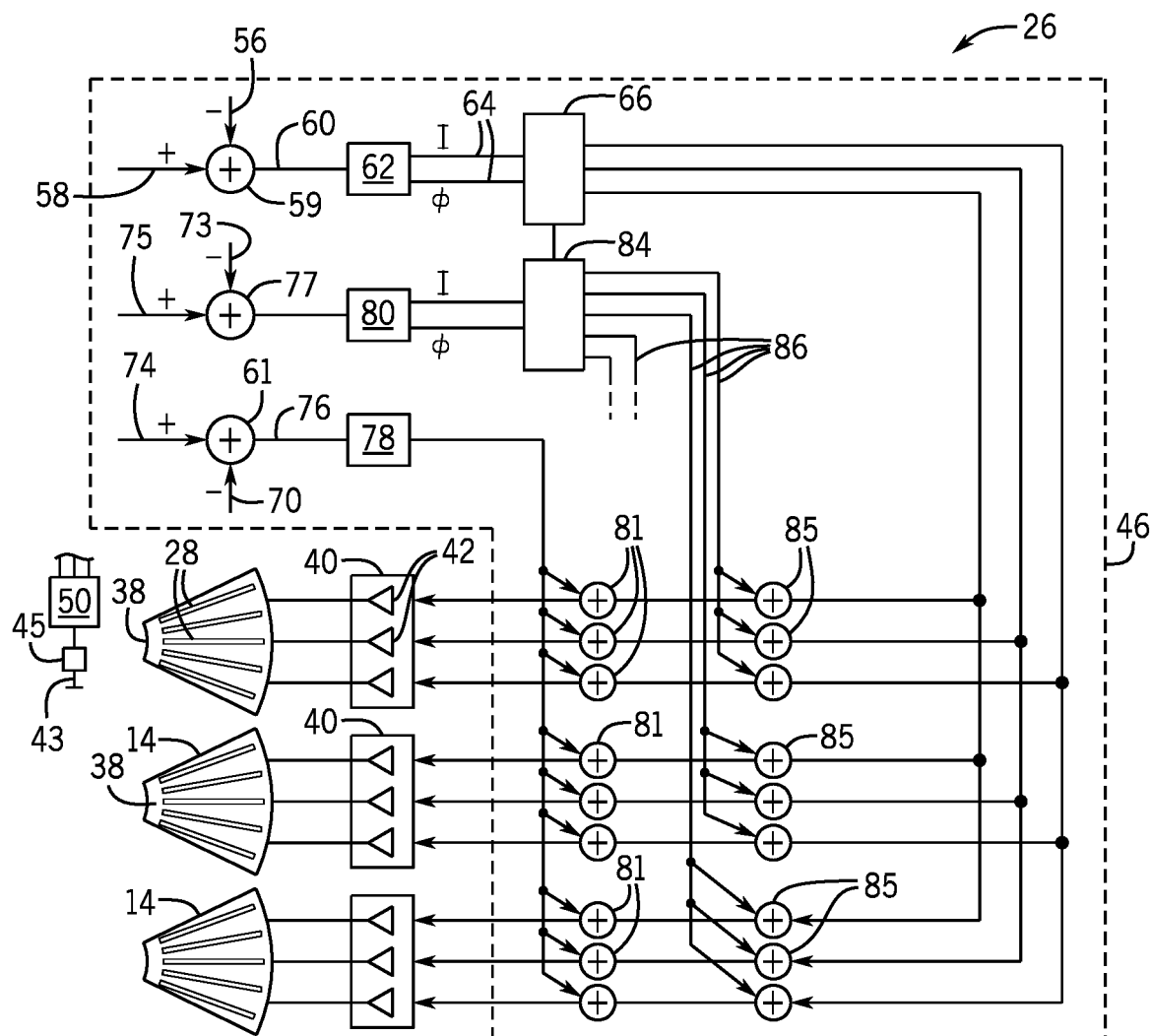
FIG. 4 is a block diagram of the controller of FIG. 1 showing multiple feedback loops for controlling rotor height, rotor wobble, and rotor speed.

Referring now to FIGS. 1, 3 and 4, as noted above, the controller 26 may include multiple phase amplifiers 42 of different sector sets 40 associated with each sector 38 of the stator panels 14. In practice, each stator panel 14 has its own sector sets 40; however, only six sector sets 40 for one stator panel 14 are shown for clarity.

These phase amplifiers 42 of each sector set may be fed by amplifier controller 46 providing sinusoidal signals to each of the phase amplifiers 42 of the sector set 40 as communicated through wiring harnesses 48 with the respective stator panels 14. Sensor signals from the sensing and detecting circuitry 45 may return from the stator panels 14 also along harnesses 48 received by sensor decoder 50 generating the various RPM, position, separation, and wobble signals discussed above. During regeneration, electrical power is received from the stator panels 14 along the harnesses 48 to be returned to the bus 47.

Referring now to FIG. 4, the controller 26 provides a first feedback loop receiving a stator position signal 56 which may be converted to a phase value of a rotating reference frame. This phase value is then compared to a desired phase 58 (for example, defining a desired torque) at summing block 59 to produce an error value 60. This error value 60 is provided to the feedback controller 62 (for example, a PID controller) generating I and Q signals 64 indicating a desired phase of a rotating electrostatic field vector generated by the stator panel 14. These I and Q signals may be received by rotational transformation block 66 (using the position signal 58) to provide a transform into a rotating domain to produce signals to each of the phase amplifiers 42 for each sector set 40 defining the phase, amplitude, and frequency of the rotating electrostatic field generated by the stator panel 14 and imposed on the rotor plates 28.

A more detailed description of this first feedback loop is found in U.S. Pat. Nos. 9,979,323 and 9,960,719, both entitled "Variable Frequency Electrostatic Drive" and both assigned to the assignee of the present invention and hereby incorporated in their entireties by reference.

Figure 5:
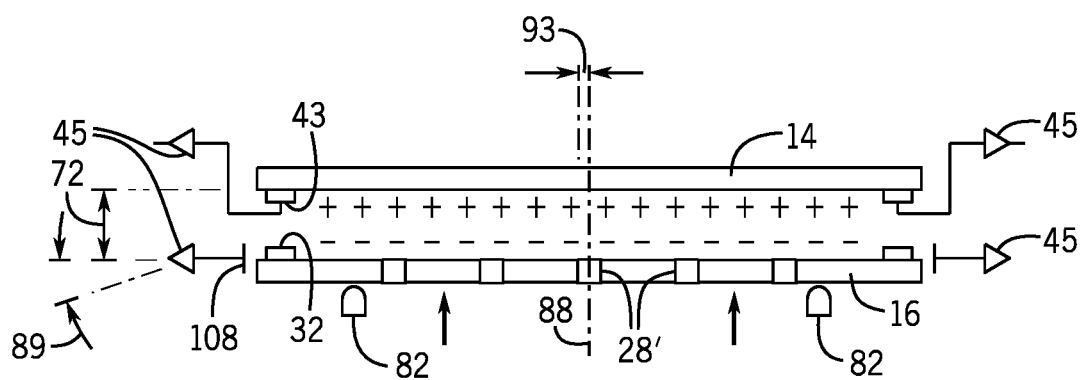
FIG. 5 is a simplified side elevational view of a corresponding stator and rotor showing sensor placement for detecting elevation wobble and speed.

Referring also to FIG. 5, sensor decoder 50 may also produce an elevation signal 70 for use in a second feedback loop. This elevation signal 70, as discussed above, indicates a separation distance 72 between the stator panel 14 and rotor disk 16 and may be compared to a desired elevation 74 (typically fixed for the particular flywheel system 10 but adjustable to accommodate shocks as will be discussed below) by summing block 61 to produce an error signal 76 provided by PID controller 78 which produces a levitation signal uniformly applied to each phase amplifier 42 of each sector set 40 by summing junctions 81 to provide uniform levitation of the rotor disk 16 pulling it away from stops 82 which hold it when not in use, centered and proximate to the stator panel 14. If the rotor disk 16 drops below the desired separation distance 72, the error signal 76 increases, for example, increasing the voltage on each of the stator plates 34 to draw the rotor disk 16 further upward.

Figure 6:
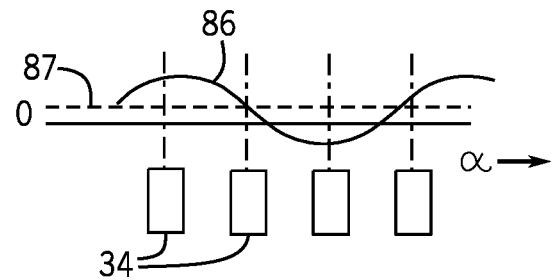
FIG. 6 is a graphical representation of superimposed AC and DC voltages applied to the stator electrically conductive plates for rotation and levitation of the rotor.
Figure 7:
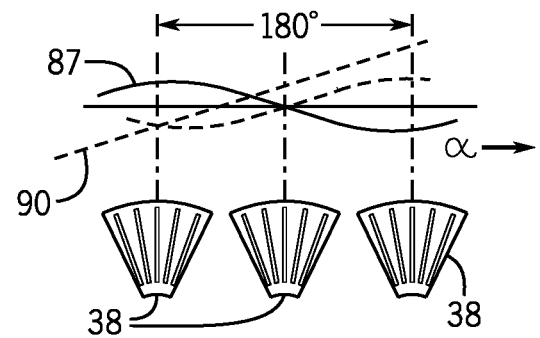
FIG. 7 is a figure similar to that of FIG. 6 showing example waveforms for correction of rotor wobble and off-center rotation.

Referring now to FIGS. 6 and 7, generally the signal from PID controller 78 will control a DC offset level 87 of a sinusoidal rotation drive signal 86, the latter of which creates the rotating electrostatic field causing rotation of the rotor disk 16. This principle of rotating the rotor disk 16 by a phased drive-signal from a stator panel, is described, for example, in U.S. Pat. Nos. 9,184,676 and 9,571,010 both entitled: "Varying Capacitance Rotating Electrical Machine" and each hereby incorporated in its entirety by reference.

Referring again to FIG. 4, sensors 43 may also be put in a third feedback loop where they are used to develop a wobble signal indicating that the axis of rotation 88 (shown in FIG. 5) of the rotor disk 16, although vertical, is not perpendicular to the upper surface of the rotor disk 16. Specifically the separation distance 72 (shown in FIG. 5) may he deduced separately for each of the sectors 38 to provide a wobble error signal 73 compared to a desired wobble 75 (typically zero) by summing block 77. The resulting error signal is received by PID controller 80 producing a wobble quadrature signal 83 necessary to correct that wobble. This signal 83 is then converted to rotating framework by the rotational transformation block 84, similar to rotational transformation block 66, to produce a set of evolving correction signals 87 provided to each sector set 40 through summing blocks 85. As shown in FIG. 7, the evolving correction signals 86 provide a circumferentially varying voltage as a function of angle about a center of the stator panel 14 to correct for that wobble by applying differential levitating forces in the different sectors 38. Generally, wobble will be self-correcting by rotationally induced forces on the rotor disk 16 which tend to straighten its axis, however, this feedback control may be used for improved stability.

This same signal may be used to correct for tilt in the axis of rotation 88 in the rotor disk 16 (even when it is perpendicular to the surface of the rotor disk 16) by means of an angularly varying DC offset 90 superimposed on signal 86 as shown in FIG. 7.

Figure 8:
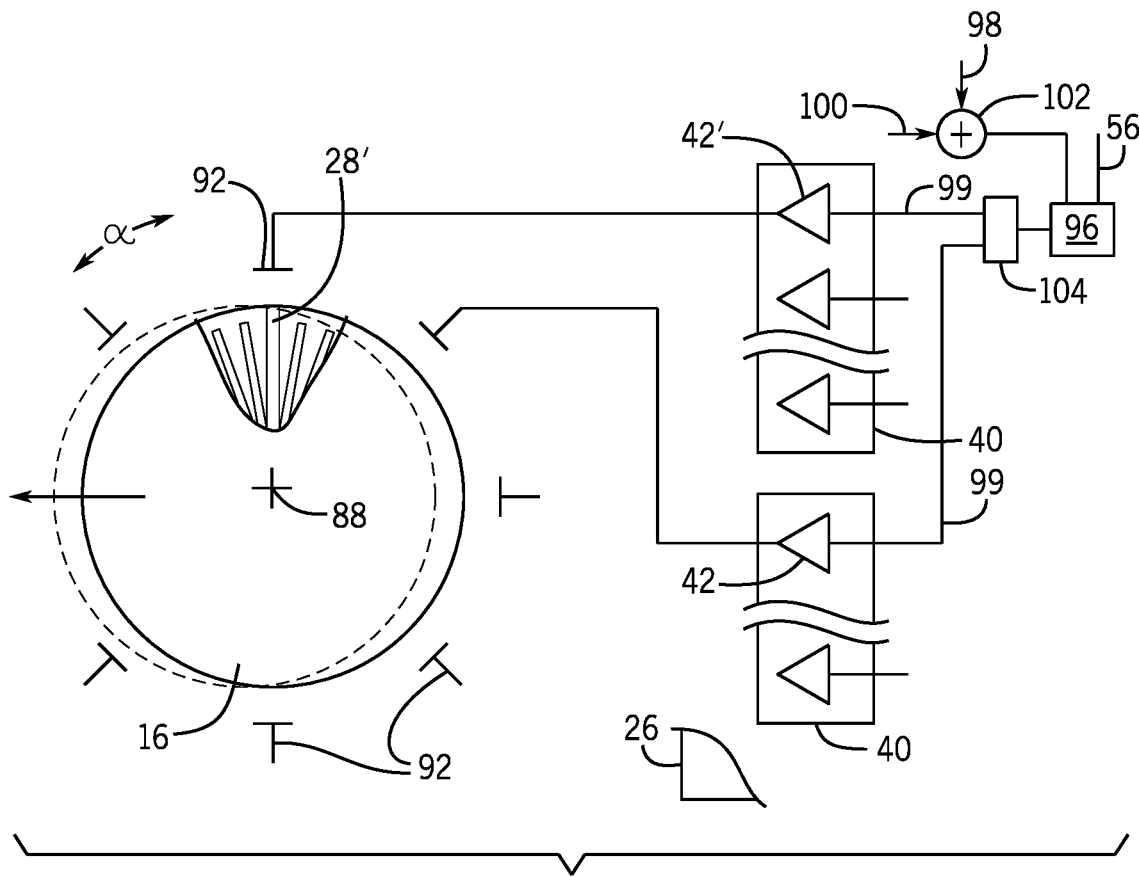
FIG. 8 is a top plan view of an auxiliary stationary electrically conductive plate system for control of off-center rotation.

Referring now to FIGS. 5 and 8, in an additional embodiment, the controller 26 may also correct for off-axis rotation 93 being the difference between alignment of the axis of rotation 88 (being at the center of mass of the rotor disk 16) and a center of the stator panel 14. Even without active correction, error will be naturally be reduced by the attractive forces between the stator panel 14 and the rotor disk 16 which tend to self-center the rotor disk 16 on the stator panel 14. Nevertheless, this off-axis rotation may be actively corrected in a fourth feedback loop by the addition of electrically conductive plates 92 extending downward from the stator panel 14 to surround the periphery of the rotor disk 16. Corresponding electrically conductive plates on the rotor disk 16, for example, an extension of some rotor plates 28 (marked as rotor plate 28') over the edge of the rotor disk 16, may then face the corresponding electrically conductive plates 92 so that forces between the conductive plates 92 and the vertical distal edges of rotor plates 28' tend to center the axis 88. The electrically conductive plates 92 may be driven by an additional phase amplifier 42' added into each sector set 40.

This additional phase amplifier 42' may receive a signal developed by an offset controller 96 receiving an offset signal 98 compared to a desired offset 100 (typically zero) by summing junction 102. The output of the offset controller 96 may be converted to a rotating framework by rotational transformation block 104 similar to rotational transformation blocks 84 and 66 shown in FIG. 4 to arrive the necessary restoring signal, for example, shown in FIG. 7 as signal 99.

Referring to FIG. 5 the development of the off-axis error signal 98 may be by means of sensing coils 108 (similar to sensing coils 43) positioned about the periphery of the rotating rotor disk 16 to measure eddy currents in targets (for example, conductive elements like the timing track 32) around a periphery of the rotor disk 16. As before other types of sensors may be used to detect this off-axis rotation.

Figure 9:
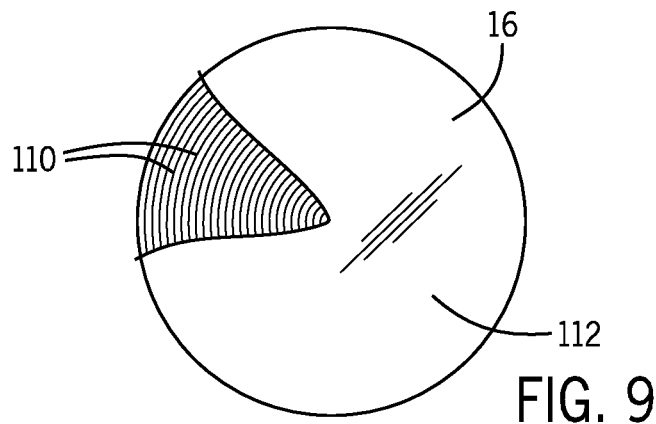
FIG. 9 is a top plan view of a simple rotor design having a uniform upper dielectric and helically wound carbon fiber for high hoop strength.

Referring now to FIG. 9 in one embodiment the rotor disks 16 need not have electrically conductive plates 28 on their upper surface but instead may present a solid dielectric material acted on by a rotating electrostatic field operating according the principle shown in US patent application 2017/0338750 entitled: "Electrostatic Rotating-Machine Employing Dielectric Substrates with Surface Conductors" assigned to the assignee of the present invention hereby incorporated by reference. In this embodiment, a rotating electrostatic field caused by the stator panels 14 polarizes the dielectric to provide an induction type torque on the rotor disk 16. It will be appreciated that this solid dielectric material must have some electrical conductivity, albeit with high resistance, to provide for the necessary torque inducing "slippage", and comparable to the resistors 30 discussed above with respect to FIG. 2.

Figure 10:
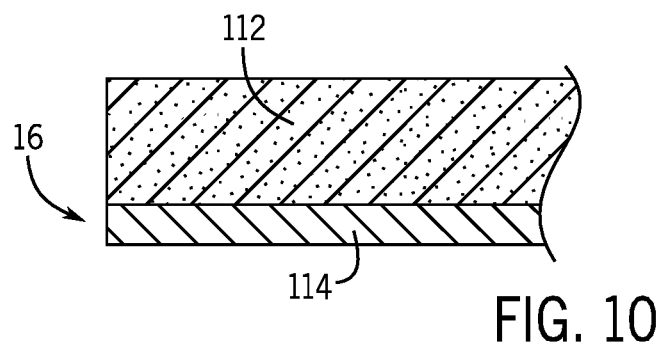
FIG. 10 is a cross-sectional view of the dielectric plate of FIG. 9.
Figure 11A:
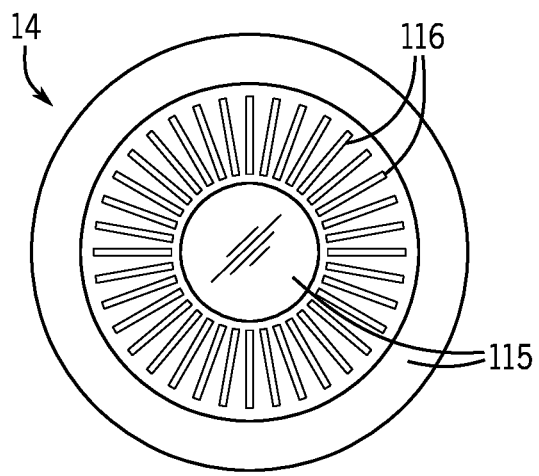
FIGS. 11a and 11b are a top plan view of a rotor electrically conductive plate and a bottom plan view of a stator electrically conductive plate when separate levitation and rotation electrically conductive plates are used.
Figure 11B:
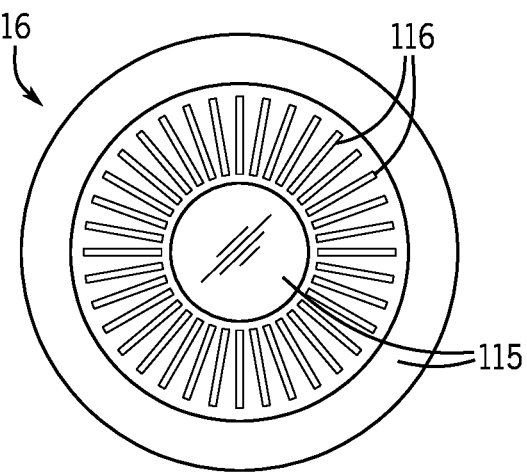

In all of the embodiments discussed above, rotor disk 16 may provide, for example, circumferentially wound carbon fibers 110 to provide maximum strength resistance against tube stresses caused by high-speed rotation. It will be appreciated that other high-strength fibers may also be used such as glass, aramid fibers, and the like Referring to FIG. 10, the upper dielectric material on 112 may he hacked by a conductive "ground" plane 114 providing improved concentration of electrostatic fields in the dielectric for improved torque and attraction qualities. Generally, the plane 114 will be electrically continuous over the entire disk of the rotor disk 16.

While the above examples show the single set of electrically conductive plates on the stator panel 14 and rotor disk 16 used for both levitation of the rotor disk 16 and rotation of that rotor disk 16, these functions may be separated into different plates, for example, by using concentric ring/disk-type electrically conductive plates 115 aligning on both the rotor disk 16 and stator panel 14 for levitation, and separate radially extending electrically conductive plates 116 serving for the generation of torque or the extraction of energy therefrom.

Referring momentarily to FIG. 1, an accelerometer 120 may be attached to the housing 12, for example, for use of the flywheel system 10 in automotive applications to provide feedforward to the controller 26 changes in the attitude of the housing 12 so that anticipatory corrective forces may be applied to the rotor disks 16 to prevent contact between the rotor disk 16 and stator panels 14.

It should be noted that in the above embodiments no mechanical or magnetic bearings are used or required and no shaft is used or required to be attached to the rotor disk 16. Generally the rotor disk 16 need not be a circular disk but may be any rotationally balanced surface functionally equivalent to a circular disk.

Generally the rotor plates 28 and stator plates 34 present continuous regions of low resistance electrical conductors to provide uniform voltage over their areas; however, thin slots or spirals may be cut into the conductive electrical plates 28 and 34 to reduce eddy current flow or the like.

The material of the rotor plates 28 and stator plates 34 may be copper or aluminum, or a conductive polymer, but in all cases is preferably nonferrous and nonmagnetic.

While two rotors are described, it will be appreciated that a single or additional rotors may be stacked coaxially or in other configurations for greater energy storage. Generally, the rotor disks 16 will be oriented horizontally in use but this restriction need not apply, for example, in space applications where gravitational influence is not significant.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are riot to be construed as necessarily requiring their performance in the particular order discussed or illustrated, unless specifically identified as an order of performance. It is also to be understood that additional or alternative steps may be employed.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A flywheel system comprising:
   a housing adapted to hold a vacuum therein;
   a rotor plate providing a rotor surface extending radially about an axis, the rotor plate positioned within the housing for rotation therein about the axis;
   a stator providing a set of independent electrically conductive plates arranged circularly about the axis displaced along the axis from the rotor surface in opposition to the rotor surface and adapted to generate a rotating electrostatic field and a lifting electrostatic field centered on that axis within the housing to both suspend and rotate the rotor plate;
   wherein the rotor plate is a high resistance dielectric material and levitation of the rotor is provided by charge induced in the dielectric material by the electrostatic field and asynchronous rotation of the rotor plate with respect to the rotating electrostatic field is provided by a resistive flow of current through the high resistance dielectric material circularly around the axis from charge induced in the dielectric material by the electrostatic field of the stator and drawn through the dielectric material by the rotating electrostatic field.

2. The flywheel system of claim 1 further including a ground plate positioned beneath the dielectric material.

3. The flywheel system of claim 1 wherein the stator electrically conductive plates extend in a plane above the rotor plate.

4. The flywheel system of claim 1 wherein the stator electrically conductive plates are divided into electrically independent segments each holding multiple electrically independent electrically conductive plates.

5. The flywheel system of claim 1 further including a second stator and second rotor positioned for coaxial rotation of the rotor and second rotor.

6. The flywheel system of claim 1 wherein the rotor plate is not attached to a magnet.

7. The flywheel system of claim 1 wherein the rotor plate is a carbon fiber matrix having circumferentially wound carbon fibers.

8. The flywheel system of claim 1 further including a sensor element adapted to measure a height of the rotor plate with respect to the stator.

9. The flywheel system of claim 8 wherein the sensor element is a stationary coil adapted to produce an AC signal electromagnetic field for inducing eddy currents induced in the rotor plate material.

10. The flywheel system of claim 1 wherein the housing includes an accelerometer attached thereto.

11. The flywheel system of claim 1 wherein the stator is adapted to store at least one watt hour of energy as rotated by the rotor and has a diameter of at least 0.5 inches.

12. A flywheel system comprising:
a housing adapted to hold a vacuum therein;
a stator providing a set of independent electrically conductive plates arranged circularly about an axis and adapted to generate a rotating electrostatic field and a lifting electrostatic field centered on that axis within the housing;
a rotor plate positioned within the housing beneath the stator adapted to be lifted by the lifting electrostatic field and rotated by the rotating electrostatic field;
wherein an upper surface of the rotor plate includes radially extending circularly arrayed electrically conductive plates; and
wherein the electrically conductive plates intercommunicate through resistive material having a higher electrical resistance than the material of the electrically conductive plates.

13. A flywheel system comprising:
a housing adapted to hold a vacuum therein;
a stator providing a set of independent electrically conductive plates arranged circularly about an axis and adapted to generate a rotating electrostatic field and a lifting electrostatic field centered on that axis within the housing;
a rotor plate positioned within the housing beneath the stator adapted to be lifted by the lifting electrostatic field and rotated by the rotating electrostatic field;
wherein the stator electrically conductive plates extend in a plane above the rotor plate; and
wherein the stator electrically conductive plates extend downward outside a periphery of the rotor plate.

14. A flywheel system comprising:
a housing adapted to hold a vacuum therein;
a rotor plate providing a rotor surface extending radially about an axis, the rotor plate positioned within the housing for rotation therein about the axis;
a stator providing a set of independent electrically conductive plates arranged circularly about the axis displaced along the axis from the rotor surface in opposition to the rotor surface and adapted to generate a rotating electrostatic, field and a lifting electrostatic field centered on that axis within the housing to both suspend and rotate the rotor plate; and
wherein the same electrically conductive plates of the stator are adapted to provide both the rotating electrostatic field and the lifting electrostatic field.

15. A flywheel system comprising:
a housing adapted to hold a vacuum therein;
a stator providing a set of independent electrically conductive plates arranged circularly about an axis and adapted to generate a rotating electrostatic field and a lifting electrostatic field centered on that axis within the housing; and
a rotor plate positioned within the housing beneath the stator adapted to be suspended by the lifting electrostatic field and rotated by the rotating electrostatic field;
further including a power controller communicating with the electrically conductive plates of the stator to apply and receive voltage to and from the stator electrically conductive plates and operating in a first mode to receive electrical power and to generate the rotating electrostatic field and the lifting electrostatic field to lift and rotate the rotor plate and operating in a second mode to regenerate electrical power from a rotating electrostatic field generated by the rotor and to generate the lifting electrostatic field from this regenerated electrical power;
wherein the rotor plate is a high resistance dielectric material and levitation of the rotor is provided by charge induced in the dielectric material by the electrostatic field and asynchronous rotation of the rotor plate with respect to the rotating electrostatic field is provided by a resistive flow of current through the high resistance dielectric material circularly around the axis from charge induced in the dielectric material by the electrostatic field of the stator and drawn through the dielectric material by the rotating electrostatic field.

16. The flywheel system of claim 15 wherein the power controller implements a first feedback loop receiving a signal from at least one sensor element to control electrostatic energy applied to the electrically conductive plates of the stator for producing the lifting electrostatic field for controlling rotor height and a second feedback loop receiving an operation signal for controlling electrostatic energy applied to the electrically conductive plates of the stator for producing the rotating electrostatic field for controlling rotor rotation.

17. The flywheel system of claim 16 wherein the power controller further implements a third feedback loop receiving a signal from the at least one sensor element to control electrostatic energy applied to the independent electrically conductive plates of the stator for producing a leveling of rotation of the rotating rotor.

18. The flywheel system of claim 16 wherein the power controller further implements a third feedback loop receiving a signal from the at least one sensor element to control electrostatic energy applied to the independent electrically conductive plates of the stator for producing a centering of rotation of the rotating rotor.

* * * * *